Jan. 17, 1950

A. C. KOENIG 2,495,107

ROLL GROOVING APPARATUS

Filed July 19, 1946

INVENTOR
ARTHUR C. KOENIG
BY Ely & Frye
ATTORNEYS

Jan. 17, 1950     A. C. KOENIG     2,495,107
ROLL GROOVING APPARATUS
Filed July 19, 1946     3 Sheets-Sheet 2

INVENTOR
ARTHUR C. KOENIG
BY Ely & Frye
ATTORNEYS

Jan. 17, 1950         A. C. KOENIG         2,495,107
                  ROLL GROOVING APPARATUS
Filed July 19, 1946                    3 Sheets-Sheet 3

INVENTOR
ARTHUR C. KOENIG
BY
Ely & Frye
ATTORNEYS

Patented Jan. 17, 1950

2,495,107

UNITED STATES PATENT OFFICE 2,495,107

ROLL GROOVING APPARATUS

Arthur C. Koenig, Cuyahoga Falls, Ohio, assignor to The Firestone Tire & Rubber Company, Akron, Ohio, a corporation of Ohio Application July 19, 1946, Serial No. 684,715

3 Claims. (Cl. 51—50)

This invention relates to roll-grooving apparatus, and more especially it relates to apparatus for forming helically arranged grooves in the peripheral surface of cylindrical metal rolls.

The invention is of especial utility for cross-grooving rolls that are employed on rubber plantations for sheeting crepe rubber. Such rolls are composed of chilled cast iron, and require first to be turned down to true diameter, and then to be helically grooved, first at one angle and then at the reverse angle to form rhombus-shaped figures on the surface thereof. Prior to the present invention two machines were required for performing the two operations, and the grooving operation was performed by a milling cutter of hardened metal. The initial cost of such milling cutters is high, and they require frequently to be resharpened, which is a difficult operation requiring the services of a highly skilled mechanic. But rubber plantations are located in tropical countries more or less remote from the United States, and suitable tools and skilled mechanics usually are not available. Accordingly it has been common practice heretofore to return the mill rolls to the United States for machining and grooving, with resulting high cost for freight and labor, and substantial loss of time. It is to the relief of these conditions that this invention primarily is directed.

The chief objects of the invention are to provide in an improved manner for grooving rolls of the character mentioned; to provide apparatus with which both the machining and the grooving operations may be accomplished; to provide apparatus of the character mentioned that does not require highly skilled operators; to obviate the expense of sharpening cutters; to obviate the cost of cutters such as previously were employed; to reduce the time required for machining and grooving rolls; and to obviate the time loss and expense previously incurred in returning the rolls to the United States for machining and grooving. Other objects will be manifest as the description proceeds.

Figure 1:
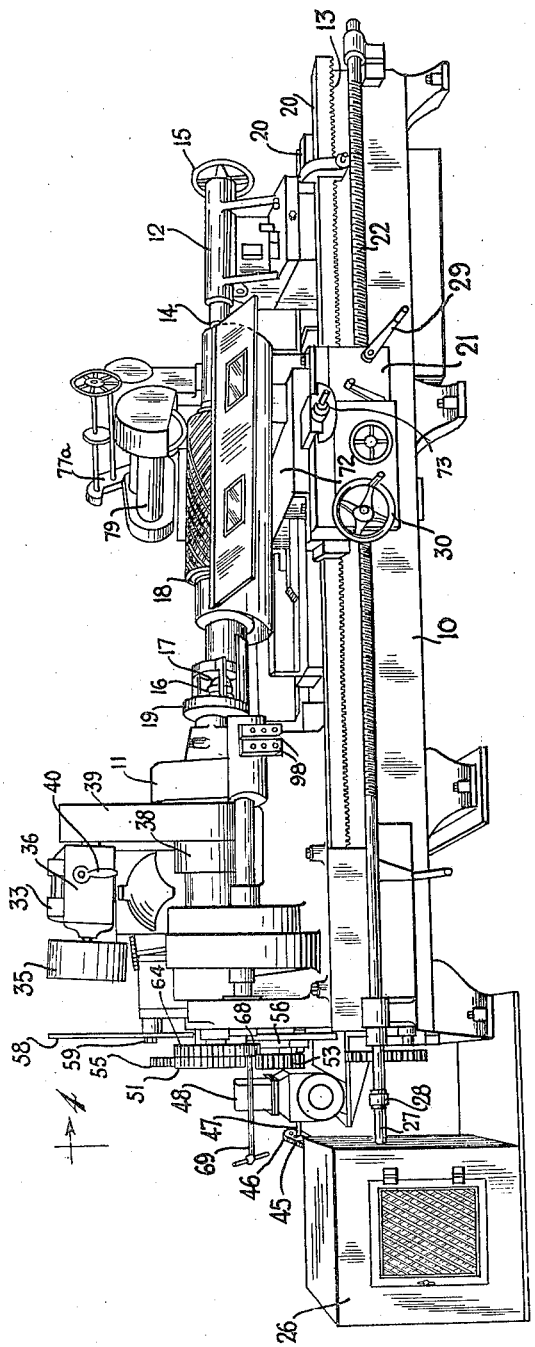
Fig. 1 is a perspective view of apparatus embodying the invention, and the work therein.

Referring to the drawings, there is shown an apparatus that in some respects is similar to an engine lathe, and which can, in fact, be used for some operations commonly performed by a lathe, for example, turning down a roll to proper diameter. As is clearly shown in Fig. 1, the apparatus comprises an elongate bed 10 having fixedly positioned at one end thereof the usual bearing housing 11, and having a tail stock 12 adjustably positioned at its other end. The tail stock is adjustable longitudinally of the apparatus by means comprising a rack 13. Said tail stock includes the usual dead center 14, and a handwheel 15 for axially adjusting the same. Extending from the housing 11, in axial alignment with the dead center 14, is a rotatable headstock spindle 16 that carries a live center 17. The latter and the dead center 14 engage opposite ends of the work to support the same, said work being herein shown as a roll 18. A driving dog 19 is mounted upon the rotatable headstock spindle 16 and engages the adjacent hub or trunnion of the roll 18 to drive or rotate the latter.

The top of the bed 10 is formed with the usual parallel, longitudinally extending ways 20, 20, and supported upon said ways and movable thereon along is a carriage 21. The usual lead screw 22 is provided for moving the carriage 21 by power means, such as the reversible two speed electric motor 23 operating through a speed-reducing device 24 to which it is connected by a sprocket chain 25, Fig. 4, said motor and speed-reducing device being enclosed within the guard 26, Fig. 1. The screw 22 is connected to the shaft 27 of the speed-reducing device 24 through the agency of a coupling 28, the arrangement being such that the said lead screw may be disconnected from the shaft 27 so as to be rotated by other power-operated means, if desired. The carriage 21 operatively engages the lead screw 22 through the agency of the usual nut (not shown), and a hand-crank 29 is provided for disengaging said nut from said lead screw. When the nut is disengaged from the lead screw, the carriage may be moved by manual effort through the agency of the usual pinion (not shown) that is meshed with the rack 13, a hand-wheel 30 being provided for turning said pinion.

The rotatable headstock spindle 16 is arranged to be driven from two different sources, of which one source develops much greater speed than the other, and is utilized to rotate the work 18 when the same is being machined to proper diameter. Said means for driving the work at relatively high speed comprises a motor 33 that is mounted upon a suitable support 34 atop the bearing housing 11 of the apparatus, said motor being connected by a belt drive (not shown but located within the guard 35) to speed-change gearing located within a gear case 36. On the output side of the latter a pulley (not shown) is connected by a transmission belt 37, Fig. 4, to a pulley 38, Fig. 1, on the axis of the spindle 16 and operatively connected thereto. A guard 39 encloses the belt 37 and the pulley at the gear case to which said belt is connected. A lever 40 on the outside of gear case 36 is provided for shifting the gears therein to vary the speed ratio between the motor 33 and the pulley 38 as is well understood by those familiar with this art.

Figure 4:
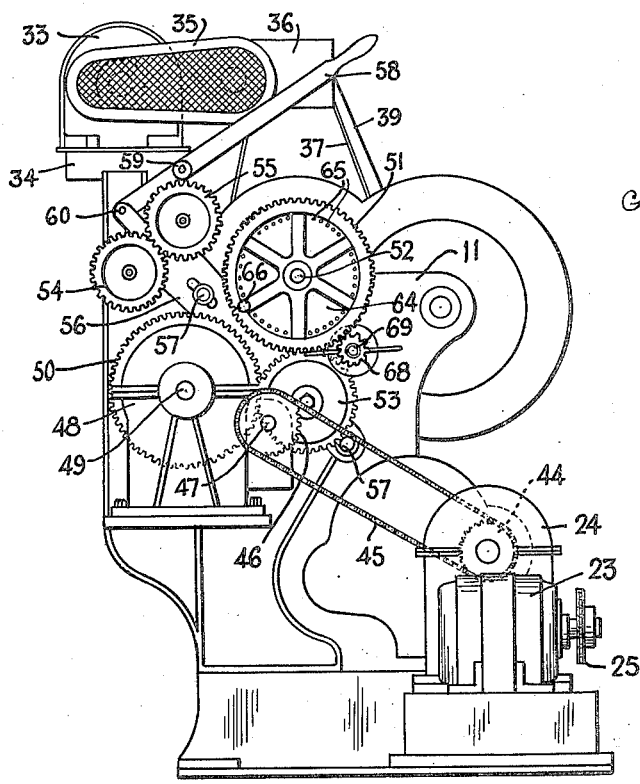
Fig. 4 is an end elevation of the apparatus.

For rotating the headstock spindle at relatively slow speed, means is provided for driving the same from the reversible motor 23. To this end the speed-reducing device 24 is provided with a driven sprocket 44 that is connected by a sprocket chain 45 with a sprocket 46 on the shaft 47 of a second speed-reducing device 48, the latter having a driven shaft 49 on which is mounted a gear 50. The latter is adapted to drive a gear 51 that is journaled upon a spindle or stub shaft 52 that is carried at one end of the headstock spindle 16, coaxially thereof, and said gear 51 may be driven in either direction. This is accomplished by means of idler gears interposed between the gears 50, 51 and selectively engageable with each. One of said idler gears, designated 53, is shown in Fig. 4 in mesh with said gears 50, 51. The other idler gears, designated 54, 55, are shown in Fig. 4 out of mesh with respective gears 50, 51, but in mesh with each other at all times. The idler gears 53, 54, and 55 are journaled on respective stub shafts that project from a shiftable bracket 56 that is mounted upon the end of the bearing housing 11, said bracket being secured to the latter by cap screws 57, 57 that extend through respective slots in the bracket. The slots are arranged longitudinally of the bracket so that the position of the latter may be adjusted longitudinally, whereby the gear 53 is in mesh with gears 50, 51 as shown, or gear 53 may be moved out of mesh therewith and gears 54, 55 moved into mesh. It will be clear that in the latter instance the gear 51 will be rotated in the opposite direction from the direction that it moves when driven through the agency of gear 53. A shifting lever 58 is pivoted on the housing 11 at 59 and pivotally connected to the upper end of the bracket 56 at 60, whereby shifting movement of the bracket is facilitated.

Positioned beside the gear 51, but keyed to the headstock spindle 16, is a gear 64. Unlike the gear 51, the gear 64 is without spokes, and its structure is pierced by an annular series of apertures 65, 65, which series is concentric with the axis of the gear. The gear 51 is formed with a bore (not shown) adapted to register with the apertures 65 upon relative rotary movement of gears 51, 64, and a locking pin 66 is inserted through said bore in gear 51 and into one of said apertures 65 to retain said gears in determined angular relation. The number of apertures 65 in gear 64 is the same as the number of helical grooves to be ground in the roll 18 that constitutes the work. When the locking pin 66 is removed, the gear 64 may be rotated relatively of the gear 51, and to this end a pinion 68 is provided, which pinion is shown in mesh with gear 64 in Figs. 1 and 4. The pinion 68 is mounted upon a rod 69 so as to be capable of manual operation, an end portion of said rod being receivable in a socket or bore (not shown) in the housing 11, which bore then constitutes a bearing for said rod. The pinion 68 and rod 69 may be removed if desired, during times when the apparatus is operating upon the work. When the gear 64 is turned relatively of the gear 51, the roll 18 also is turned, and thus is moved relatively of the roll-grooving mechanism, presently to be described, whereby the latter may be operated upon a different region circumferentially of the roll and thus produce another groove therein. It will be understood that the roll 18 will be indexed in the manner described after each groove is cut in the roll, the pin 66 being replaced after each indexing operation to provide driving connection between gears 51 and 64, whereby the roll 18 is rotated in timed relation to the longitudinal movement of the carriage 21, which carriage carries the roll-grooving mechanism.

Figure 2:
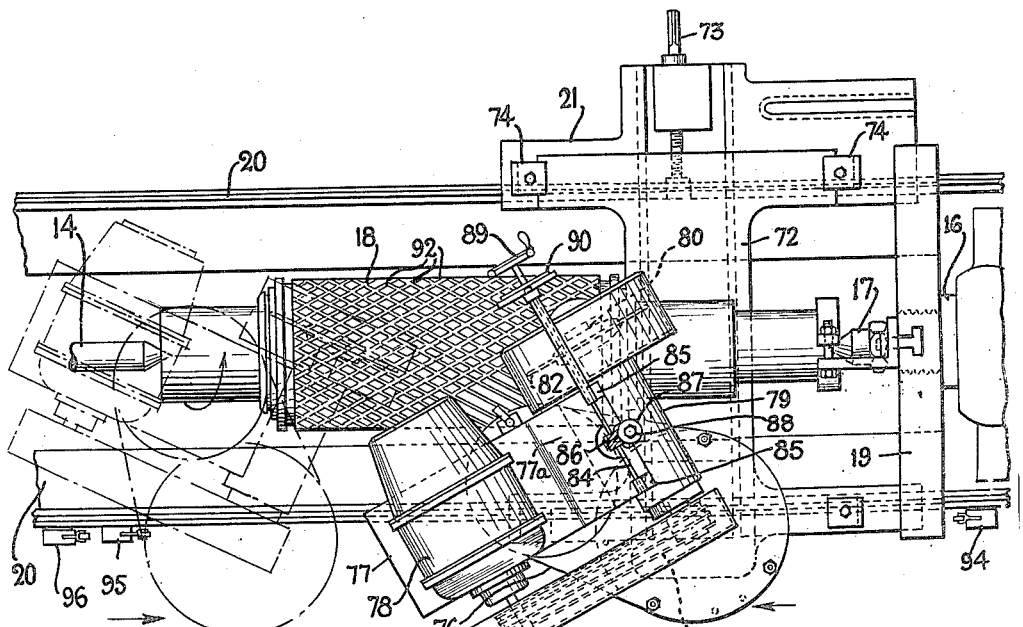
Fig. 2 is a plan view, on a larger scale, of the groove-cutting mechanism of the apparatus, in operation upon the work.
Figure 3:
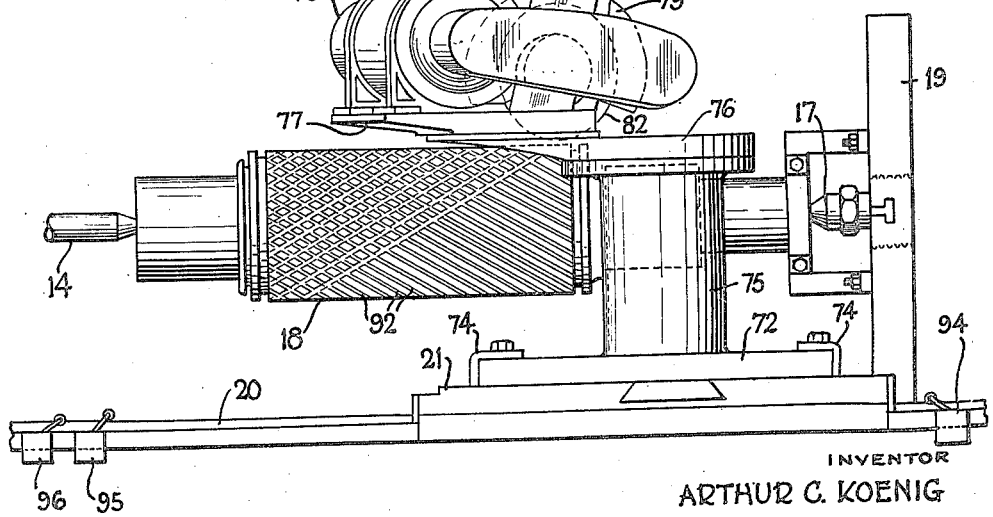
Fig. 3 is an elevation of the structure shown in Fig. 2, as viewed from the near side thereof.
Figure 5:
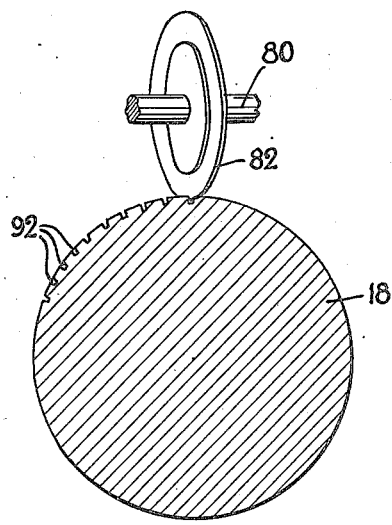
Fig. 5 is a transverse section through a work-unit in the course of being grooved, showing a grooving tool in operative association therewith.

The roll-grooving mechanism, which is best shown in Figs. 2 and 3, comprises a slide 72 that is mounted upon the top of the carriage 21 for adjustment in the direction that is transverse to the movement of said carriage. An adjusting screw 73 is provided for adjusting the position of the slide 72 on the carriage, and a plurality of clamps 74 are provided for securing the slide in adjusted position. Rising from the top of the slide 72 is a vertical standard or bearing 75, which standard is located at one end of the slide, and laterally a substantial distance from the centerline of the apparatus. Mounted upon the top of the standard 75 is a supporting arm 76 that extends radially thereof and overhangs the standard. The arm 76 is capable of angular adjustment relatively of the standard 75 so as to alter the position of its free end with relation to the longitudinal centerline of the apparatus, as will be apparent from a comparison of the full line position and broken line position of the arm shown in Fig. 2. Mounted upon the free end of said arm, and having limited angular adjustability about a vertical axis thereon is a base plate 77 upon one end of which is mounted an electric motor 78. The opposite end portion 77a of said base plate extends obliquely upwardly and is formed, on the face thereof remote from the motor 78, with ways (not shown) in which a bearing carriage 79 is slidably mounted for up and down movement. Journaled in the carriage 79 is a horizontal shaft 80 that is disposed parallel to the axis of motor 78, one end of said shaft having driving connection with said motor through the agency of a series of side-driving transmission belts 81, the opposite end of said shaft having an abrading disc 82 mounted thereon. The disc 82 is positioned above the work 18, and obliquely intersects the vertical plane of the axis thereof, as is shown in Figs. 2 and 5.

The disc 82 is adjustable up and down, through the agency of the carriage 79, to feed the disc into the work and to withdraw it therefrom, and to this end an adjusting shaft 84 is journaled in suitable bearing brackets 85, 85 mounted at the top of the upwardly extending portion 77a of base plate 77. Mounted upon the shaft 84, between said brackets 85, is a screw worm 86, the latter being meshed with a worm wheel 87 that is mounted upon the upper end of a shaft 88 said shaft having threaded connection (not shown) with the carriage 79. The arrangement is such that the carriage may be raised or lowered simply by turning the shaft 84 in the proper direction. The shaft 84 has one end thereof provided with a hand wheel 89 by which it readily is turned, and there is a calibrated dial 90 operatively associated with the said shaft to indicate the elevation of the carriage 79 when the shaft is in various angular positions. Thus it is possible to position said carriage at the same elevation at the start of each operative cycle of the apparatus.

As previously explained, the carriage 21 is moved longitudinally of its ways 20 by the lead screw 22, and the latter is driven by the same power means (the motor 23) that drives the work 18 during a roll-grooving operation. Thus the linear speed of the carriage 21 is in determinate relation to the angular or rotary speed of the work 18, with the result that the abrading disc 82, disposed at an angle to the axis of the work and fed into the latter at one end thereof, will cut into the roll and produce a helical groove therein extending to the opposite end thereof. Such grooves are shown at 92, 92 in the drawings. In cutting each of said grooves 92 the carriage 21 is required twice to traverse the length of the work, the position of the disc 82 being adjusted after each traverse of the carriage. After the carriage traverses the work its movement is arrested automatically by electrical switches that are operated by movement of the carriage, said switches being in the electrical circuit of the motor 23. Said switches consist of a reversing and stopping switch 94, Fig. 3, located on the bed 10, in the path of the carriage 21, near the headstock of the apparatus. Similarly located adjacent the tailstock of the apparatus is a stop switch 95 that is inoperative as the carriage first moves therepast but effects stopping of the carriage upon return movement of the carriage. Immediately beyond switch 95 is a reversing switch 96. Other control switches for the motor 23, and also for motor 33 are shown at 98, Fig. 1.

In the operation of the apparatus, assume that a work-roll 18 is operatively mounted in the apparatus, and that the carriage 21 is stationary and located adjacent the headstock of the apparatus, as shown in Figs. 2 and 3, the motor 78 being in operation so as to drive the abrading disc 82, the latter being in elevated position above the work at the end thereof. The first step of a cycle of operation is to lower the disc 82 to the surface of the roll 18, which is effected by means of the hand wheel 89, after which the disc is fed into the work to one-half the ultimate depth of the groove to be formed, the calibrated dial 90 making it possible to gauge this operation to a nicety. The motor 23 is then started in operation, as by means of one of the switches 98, with the result that the roll 18 is rotated upon its axis, and the carriage 21 is moved toward the tail stock of the apparatus by reason of its engagement with lead screw 22, the angular movement of the roll and the traverse of the carriage being in determinate time relation. The arrangement is such that the disc 82 cuts a helical groove 92 in the surface of roll 18, but only to half the desired depth.

As the carriage 21 reaches the end of its traverse and the disc 82 passes the end of roll 18, said carriage first engages and throws switch 95, with no resulting consequences, and then engages and throws switch 96. This reverses the direction of rotation of motor 23 and starts the carriage 21 back toward the headstock. Almost immediately it engages and operates the switch 95, with the result that motor 23 ceases rotation and traveling movement of the carriage is arrested. The operator then operates hand wheel 89 to elevate the abrading disc 82 above the roll 18, after which he again starts the motor 23 by operating one of the switches 98. Said motor 23 is a two-speed motor, and when driven in reverse direction operates at higher speed than it did prior to being reversed by switch 96. Thus the carriage 21 rapidly is returned to point of starting, and the roll 18 reversely rotated in timed relation thereto, movement of both being arrested as the motor 23 stops as the carriage operates the reversing and stopping switch 94.

The operator next lowers the abrading disc 82 to the position where it is capable of cutting the groove 92 to the full depth desired. Then by operating the proper switch 98, he initiates the second phase of a cycle of operation, which phase is identical with the first phase just described, except that the abrading disc, operating in the shallow groove 92 cut during the previous traverse of the carriage 21, cuts said groove to its ultimate depth. After the groove is cut, the disc 82 elevated, and the carriage returned to point of starting adjacent the head stock in the manner previously described, the roll 18 requires to be indexed angularly prior to the cutting of the next groove therein. This is effected by removing the locking pin 66, slightly rotating the gear 64 relatively of gear 51 by means of the manually operable pinion 68, and then replacing pin 66 in the aperture 65 of gear 64 that is next to the aperture previously occupied by said locking pin. Rotation of gear 64 as described effects corresponding rotation of the work-roll 18, but since the gears 64, 51 are disconnected when such rotation is effected, it produces no corresponding rotation of lead screw 22, and there is no movement of the carriage 21. Thus the roll 18 and carriage are adjusted to a new relationship such that the next cycle of operation will cut a rollgroove 92 that will be parallel to and circumferentially spaced apart from the groove previously cut.

This completes a cycle of operation which will be repeated as described until the peripheral surface of the work-roll is completely grooved, all of the grooves extending parallel to each other. Thereafter the roll is formed with a second series of grooves that are similar to those previously formed, but are disposed at different angles so as to intersect those previously formed and thus provide a multiplicity of rhombusshaped characters on the roll, as shown. To cut the second series of grooves 92 with the apparatus described, the arm 76 on the carriage 21 is swung from the position shown in full lines in Fig. 2 to the position shown in broken lines in the same figure, thus reversing the angular position of the abrading disc 82 with relation to the roll 18. Each cycle of operation will begin and end with the carriage at the tail stock end of its traverse, and the controls of the reversible motor 23 will be adjusted so that the cutting traverse of the carriage will be at relatively slow speed and the return traverse will be at relatively rapid speed.

The feature of the switches 95, 96 by which the carriage reverses its movement for a short distance before coming to a stop, at one end of its traverse, takes up back lash in the apparatus and makes it possible for the disc 82 to register exactly with the half-depth groove 92 when cutting said groove to its ultimate depth during the second traverse of the carriage. The invention reduces the time required for machining and grooving rolls, it obviates the use of milling cutters and the expense of sharpening the same, and effects other economies and achieves other advantages as set out in the foregoing statement of objects.

Modification may be resorted to without departing from the spirit of the invention or the scope thereof as defined by the appended claims.

What is claimed is:

1. In apparatus of the class described, in combination, a support for a work piece, a tool-carrying carriage reciprocable parallel to the axis of said work piece, a grinding tool mounted on said carriage and disposed at an angle to the axis of the work, a lead screw for impelling said carriage, a reversible two-speed electric motor operating through a speed reducing device in driving association with the lead screw, a plurality of electrical switches in the electric circuit of the reversible motor, some of said switches being operable by contact with said carriage, one said switch being so positioned as to be operated by the carriage whereby it reverses said reversible motor and the direction of travel of the carriage by contact with said carriage immediately after a grinding tool on the carriage passes beyond the end of said work, another of said switches so disposed relative to travel of said carriage as to be operated and to stop movement of said carriage upon the beginning of its reversed direction of travel, manually operable means adapted to raise the grinding tool out of contact with said work, a manually operated switch adapted to start the said motor in its reversed direction, said motor operating more rapidly in its reversed direction than in its forward direction, whereby said carriage is reciprocated faster than it is advanced.

2. In apparatus of the class described, in combination, a support for a work piece, a tool-carrying carriage reciprocable parallel to the axis of said work piece, a grinding tool mounted on said carriage and disposed at an angle to the axis of the work, a lead screw for impelling said carriage, a reversible two-speed electric motor operating through a speed reducing device in driving association with the lead screw, a plurality of electrical switches in the electric circuit of the reversible motor, some of said switches being operable by contact with said carriage, one said switch being so positioned as to be operated by the carriage whereby it reverses said reversible motor and the direction of travel of the carriage by contact with said carriage immediately after a grinding tool on the carriage passes beyond the end of said work, another of said switches so disposed relative to travel of said carriage as to be operated and to stop movement of said carriage upon the beginning of its reversed direction of travel, manually operable means adapted to raise the grinding tool out of contact with said work, a manually operated switch adapted to start the said motor in its reversed direction, said motor operating more rapidly in its reversed direction than in its forward direction, whereby said carriage is reciprocated faster than it is advanced, means for adjusting the relative positions of the grinding tool and the work; said latter means comprising a driven gear disposed coaxially with an indexing plate and in rotatable driving relation to said work, a gear in axial alignment with said driven gear and being adapted for manual rotation relative to said driven gear whereby the work is moved relatively of the said grinding tool, and means for locking said driven gear and said hand operable gear together.

3. In apparatus of the class described, in combination, a support for a work piece, a tool-carrying carriage reciprocable parallel to the axis of said work piece, a grinding tool mounted on said carriage and disposed at an angle to the axis of the work, a lead screw for impelling said carriage, a reversible two-speed electric motor operating through a speed reducing device in driving association with the lead screw, a plurality of electrical switches in the electric circuit of the reversible motor, some of said switches being operable by contact with said carriage, one said switch being so positioned as to be operated by the carriage whereby it reverses said reversible motor and the direction of travel of the carriage by contact with said carriage immediately after a grinding tool on the carriage passes beyond the end of said work, another of said switches so disposed relative to travel of said carriage as to be operated and to stop movement of said carriage upon the beginning of its reversed direction of travel, manually operable means adapted to raise the grinding tool out of contact with said work, a manually operated switch adapted to start the said motor in its reversed direction, said motor operating more rapidly in its reversed direction than in its forward direction, whereby said carriage is reciprocated faster than it is advanced, means for adjusting the relative positions of the grinding tool and the work; said latter means comprising a driven gear disposed coaxially with an indexing plate and in rotatable driving relation to said work, a gear in axial alignment with said driven gear and being adapted for manual rotation relative to said driven gear whereby the work is moved relatively of the said grinding tool, and means for locking said driven gear and said hand operable gear together, means for changing the angle of said tool relative the work and means for adjusting the said switch controls of said motor so that the relative movement of the grinding tool and the work piece will be in the same relation as set out hereinbefore except being adapted to operate in reverse direction relative the work.

ARTHUR C. KOENIG.

REFERENCES CITED

The following references are of record in the file of this patent:

UNITED STATES PATENTS

| Number | Name | Date |
|---|---|---|
| 1,340,031 | Fitzpatrick | May 11, 1920 |
| 1,419,812 | Burnett | June 13, 1922 |
| 1,504,519 | Search | Aug. 12, 1924 |
| 1,818,288 | Walker | Aug. 11, 1931 |
| 2,347,766 | Briney | May 2, 1944 |
| 2,397,463 | Boeck et al. | Apr. 2, 1946 |